INVENTOR.
JOSEPH BROWN.
BY
ATTORNEY.

April 4, 1950　　　　J. BROWN　　　　2,502,416
RETRACTABLE EJECTING DEVICE
Filed June 5, 1946　　　　　　　　2 Sheets-Sheet 2
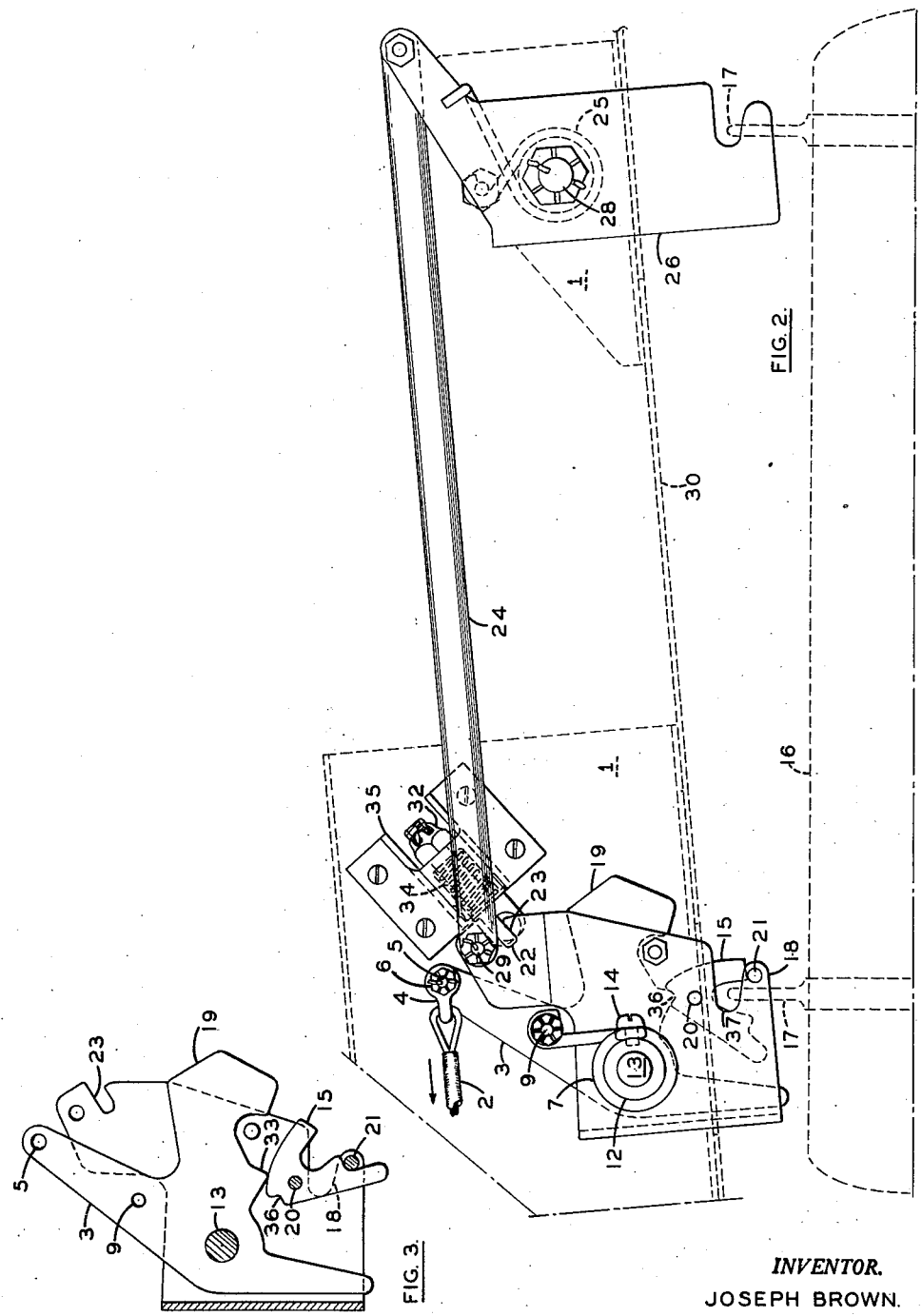
INVENTOR.
JOSEPH BROWN.
BY
ATTORNEY.

Patented Apr. 4, 1950

2,502,416

UNITED STATES PATENT OFFICE 2,502,416

RETRACTABLE EJECTING DEVICE

Joseph Brown, Philadelphia, Pa.

Application June 5, 1946, Serial No. 674,416

4 Claims. (Cl. 294—83)

(Granted under the act of March 3, 1883, as amended April 30, 1928; 370 O. G. 757)

The invention described herein may be manufactured and used by or for the Government for governmental purposes without the payment of any royalty thereon.

This invention relates to new and useful improvements in an ejecting device and more particularly to a device such that, after an object has been ejected from supporting structure such as an airplane, the attaching mechanism for the ejected object is retracted within the supporting structure so that the external surface of said supporting structure becomes free from projections of any of the attaching members.

In many instances it is desirable, after detaching objects from their supports, to have the supporting member retract into or flush with the supporting surfaces, for instance into the wings or fuselage of an airplane, in such a manner that there are no projecting surfaces of said supports projecting into the slip stream or airflow passing across the wing or fuselage surfaces. Airplanes are often required to carry disposable loads such as mail-bags, spare fuel tanks, smoke-screen containers, insect sprayers, bombs, rockets, projectiles, jet assisted take-off devices, etc.

Any projection that interferes with the smooth flow of air over the surfaces of an object such as an airfoil passing through the air causes an additional drag that reduces the aerodynamic efficiency. It is very desirable to maintain this efficiency at as high a point as possible as it affects the payload that can be carried, the speed of flight, the power consumption and the safe operation of an airplane.

In an airplane, because of the many duties performed by the pilot during flight, it is necessary that the operation of all devices under his control be as simple and as easy to operate as possible and entirely reliable and "foolproof." Such devices must operate under wide variations of temperature and weather conditions and always be dependable for immediate operation under all the various and often undesirable conditions found in flight.

With this in mind, the principal object of this invention is to provide a detaching device that retracts within or flush with its supporting surfaces so that all projecting areas of said device are withdrawn within or flush with their supporting area immediately after the attached object is released and ejected from its fastenings included in said device.

Another object is to provide a positive locking and a positive releasing and detaching device for objects supported by attachments that are retractable so as to be flush with or within their supporting surfaces wherein the release and retraction is accomplished with little attention and effort on the part of the operator.

Still another object is to provide a device in which the attached object, after being released from its supports, is ejected from said supports despite external pressure having a tendency to hold the released object in its supporting members.

A further object is to provide a device that is spring actuated upon release by the operator, so that its supporting members are withdrawn flush with or within a confining supporting member and do not interfere with the airflow across said confining support.

A still further object is to provide a device that is simple and inexpensive to manufacture and yet durable, serviced easily and reliable, has comparatively few moving parts and can be preloaded for immediate and fast action upon its release by a simple release cord that can be controlled by an operator with little effort or distraction from his other duties.

A still further object is to provide a device by which an object is locked permanently and securely in its support so that it cannot be released from said support until the release cord is pulled. Pulling said cord unlocks the device so that the object is released and ejected before the spring-loaded retracting mechanism operates, thus retracting the supporting members into their retracted position within their supporting area.

These and other objects of the invention and the various features and details of construction and operation thereof are hereinafter more fully set forth and described with reference to the accompanying drawings, in which like numbers refer to like parts.

Fig. 2 is a side-elevational view of the mechanism; and

Fig. 3 is a side-elevational view of the cams thereof shown in another operating position.

Figure 1:
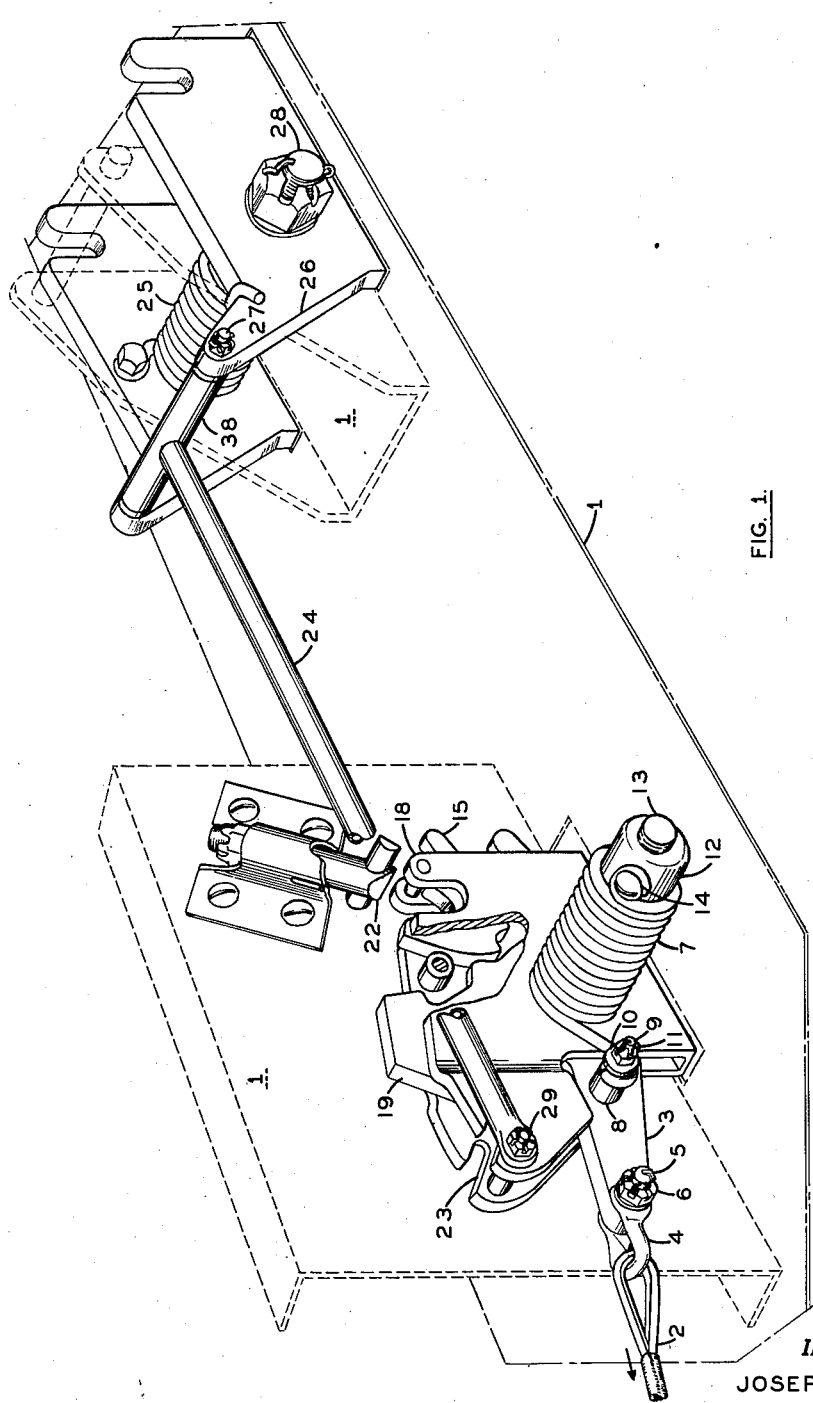
Fig. 1 is an isometric view of a retractible ejecting device with portions cut away.

Various supporting members are shown at 1. Cord 2 is the operating cord that is pulled when the operator desires to release the load. A pull on cord 2 actuates lever 3, which is connected to cord 2 by clevis 4 through bolt 5, which is retained by nut 6. Coil spring 7 is also fastened to lever 3 through collar 8 and bolt 9, said collar being free to rotate on bolt 9 and held in place by washer 10 and nut 11.

Spring 7 is attached to collar 12, which is rotated on shaft 13, so as to place said collar under tension, said collar 12 being then fastened to bolt 13 by set screw 14. Torque is applied to lever 3 through collar 8 and bolt 9 by spring 7, so as to hold the mechanism in locked projected position. Lever 3 engages latch 15 (see Fig. 2) when the load 16 is held by a loop 17 attached thereto and passing over a fixed supporting member 18. As lever 3 is rotated about its center on its supporting bolt 13, it releases latch 15 so that said latch can rotate on its bearing on pin 20, move against stop pin 21 and thereby eject loop 17, attached to and supporting load 16, and further push loop 17 from its support 18, thereby insuring the complete release of load 16 under all conditions. (As lever 3 rotates on its axis, pin 13, and disengages projection 33 from notch 36, in normal level flight the slipstream force is effective to push the load off the supporting members. However, positive disengagement means is desirable during dives and other maneuvers, and is effected by the subject device: Operation of the pull cord 2 not only disengages latch 15 but, by the same action, the lower tip of lever 3 pushes latch 15 and forces said latch from the position shown in Fig. 2 to the position shown in Fig. 3, thus disengaging loop 17 positively.

After the release and detachment of load 16, lever 3 continues to rotate about its central supporting bolt 13 until its cam face 19 engages plunger 22 and lifts it from latch 23 in support plate 18. Said plate 18, bearing on bolt 13 and rotating thereabout, holds latch 23 and plunger 22 in engagement when mechanism is loaded by load 16. Link 24, which is held under compression by coil spring 25, retracts support plates 18 and 26 simultaneously when released by pulling cord 2. Support plate 26 rotates on bolt 28 and, through spring 25, exerts a force on link 24. Link 24 is attached to the load-carrying support-plates 18 and 26 at either end through bolts 27 and 29 respectively. Link 24, under compression of spring 25, transmits a torque to the load-supporting plates 18 and 26 such that said plates revolve about their supporting bolts 13 and 28 as centers so as to withdraw said supports 18 and 26 simultaneously into their respective housings. The mechanism is then held in this withdrawn position by link arm 38 bearing against a stop, not shown, provided on the installation, until the device is reloaded. When in locked position and carrying load 16, plunger 22 is held in notch 23 of supporting plate 18 by spring 34 in its supporting bracket 35 against nut 32.

For reloading, supporting plates 18 and 26 are rotated about their centers on bolts 13 and 28 respectively against the torque of coil-spring 25 so that said supports project beyond their housings, plunger 22 engages notch 23 in support plate 18 and cam 15 engages projection 33 on lever 3 at notch 36, so that loop 17 of load 16 is locked in slot 37 by cam plate 15, the device being now held under tension of springs 7 and 25 ready to release the load by pulling cord 2 and then retracting into its housing.

From the foregoing description and illustration of the present invention it is apparent that a loading and ejecting device of simple design is provided wherein a load can be installed and locked in place quickly and easily, and, when the mechanism is actuated, said load is not only released but ejected positively from its supports. After the load has been cleared, the mechanism retracts the load-supporting members within the supporting body so that said supporting body has no projecting area that would offer an undesirable drag for its passage through the supporting medium, and said supports are locked in their retracted position until the device is reloaded and ready for another release.

While a particular embodiment of the invention has been shown and described herein, it is not intended that the invention be limited to such disclosure, but that changes and modifications may be made and incorporated within the scope of the claims.

I claim:

1. A retractable ejecting device comprising load-supporting means adapted to be mounted eccentrically and rotatably on a shaft within a supporting structure, spring-actuated means to rotate said load-supporting means, spring-actuated means to secure said load-supporting means releasably against such rotation, means to secure an object releasably on said load-supporting means, and means to disengage both said securing means and eject such object from said load-supporting means positively.

2. A retractable ejecting device comprising a first load-supporting element adapted to be mounted eccentrically and rotatably on a first shaft within a supporting structure, a second load-supporting element adapted to be mounted eccentrically and rotatably on a second shaft within said supporting structure, said second shaft being disposed in axial parallelism with said first shaft, a link coupling said first and second elements eccentric the centers of rotation thereof, spring-actuated means to rotate said load-supporting elements, means to secure said load-supporting elements releasably against such rotation, means to secure an object releasably on said load-supporting elements, and means to disengage both said securing means and eject such object from said load-supporting elements positively.

3. A retractable ejecting device comprising a first load-supporting element adapted to be mounted eccentrically and rotatably on a first shaft within a supporting structure, a second load-supporting element adapted to be mounted eccentrically and rotatably on a second shaft within said supporting structure, said second shaft being disposed in axial parallelism with said first shaft, a link coupling said first and second elements eccentric the centers of rotation thereof, spring-actuated means to rotate said load-supporting elements, means to secure said load-supporting elements releasably against such rotation, means to secure an object releasably on said load-supporting elements, and a triform lever mounted rotatably on one of said shafts, said lever being adapted to disengage both said securing means and effect ejection of such object from said load-supporting elements positively.

4. A retractable ejecting device comprising a first shaft adapted to be mounted within a supporting structure, a first plate mounted eccentrically and rotatably on said first shaft, a portion of said plate extending beyond said structure when in one position and having a loop-receiving finger in said extending portion, a stop-pin in said finger, a slotted arm extending from another portion of said plate, spring-tension means mounted on said shaft and adapted to secure said plate in selected position, a spring-actuated plunger mounted on said support and secured releasably in the slot of said arm, a triform lever mounted rotatably on said first shaft, the medial arm of said lever having a cam surface adapted to eject said plunger from said slotted arm upon rotation of said lever, and having a projection on an edge thereof, means to rotate said lever, a latch mounted rotatably on said plate, said latch having a first leg adapted to register with said stop-pin and secure an object on said loop-receiving finger when a detent in said latch is engaged by said projection, and having a second leg adapted to register with said stop-pin and eject an object from said finger responsive the force of a leg of said lever, a second shaft adapted to be mounted within said supporting structure in axial parallelism with said first shaft, a second plate mounted eccentrically and rotatably on said second shaft, a portion of said second plate extending beyond said structure when in one position and having a loop-receiving finger in said extending portion in corresponding relation to the loop-receiving finger of said first plate, a link connecting said arm of said first plate and a correspondingly positioned point on said second plate, spring-actuated means to rotate said plates, and means to limit such rotation.

JOSEPH BROWN.

REFERENCES CITED

The following references are of record in the file of this patent:

UNITED STATES PATENTS

| Number | Name | Date |
| --- | --- | --- |
| 1,081,984 | Peel | Dec. 23, 1913 |
| 1,158,392 | Schutte | Oct. 26, 1915 |
| 1,283,151 | Gledhill | Oct. 29, 1918 |
| 1,890,142 | Bollam | Dec. 6, 1932 |
| 2,296,360 | Markey | Sept. 22, 1942 |